United States Patent [19]

Rahlwes et al.

[11] Patent Number: 4,738,830
[45] Date of Patent: Apr. 19, 1988

[54] CATALYST REGENERATION

[75] Inventors: William C. Rahlwes; Kelly G. Knopp, both of Sweeny, Tex.

[73] Assignee: Phillips Petroleum Company, Bartlesville, Okla.

[21] Appl. No.: 879,681

[22] Filed: Jun. 27, 1986

[51] Int. Cl.$^4$ .................................................. B01J 8/18
[52] U.S. Cl. ..................................... 422/144; 422/311
[58] Field of Search ...................... 422/143, 144, 311; 239/589, 592, 601

[56] References Cited

U.S. PATENT DOCUMENTS

3,040,439  6/1962  Frost .................................... 422/143
4,150,090  4/1979  Murphy et al. ...................... 422/144
4,322,384  3/1982  Sutton .................................. 422/144
4,443,551  4/1984  Lionetti et al. ..................... 422/143

Primary Examiner—Barry S. Richman
Assistant Examiner—William R. Johnson
Attorney, Agent, or Firm—Paul S. Chirgott

[57] ABSTRACT

Catalytic regenerators, nozzle designs and processes suitable for introducing regeneration air into a catalytic cracking unit which substantially reduce erosion induced nozzle failures, include at least one nozzle which has at least one planer surface generally parallel to the nozzle's longitudinal axis. In another embodiment, at least one nozzle has a plurality of planer surfaces generally parallel to the nozzle's longitudinal axis.

9 Claims, 6 Drawing Sheets

FIG. 13 and appended claims.

CATALYST REGENERATION

FIELD OF THE INVENTION

This invention relates to certain aspects of a regenerator in a catalytic cracking unit. In other aspects, the invention relates to improved methods of regenerating a catalytic cracking catalyst.

BACKGROUND OF THE INVENTION

A catalytic cracking catalyst is conventionally regenerated by burning off coke deposits which were deposited thereon during the previous hydrocarbon cracking cycle. The burning off of such coke deposits generally occurs in a fluidized catalyst bed in the presence of air optionally containing oxygen. The air is distributed into the bed through hundreds of nozzles connected to a piping system located within the catalyst regenerator. When the nozzles erode due to the conditions within a conventional regenerator, catalyst is drawn into the air piping system, cutting and eroding the pipes from the inside. This inevitable erosion results in a loss of the ability to distribute the air throughout the fluidized bed. Consequently, catalyst can no longer be regenerated properly resulting in a decrease of unit product values. Furthermore, damage to the regenerator could be very extensive due to the uncontrolled discharge of air from eroded piping.

OBJECTS OF THE INVENTION

It is an object of this invention to provide an improved catalyst regenerator in a catalytic cracking unit.

It is a further object of this invention to provide improved air distribution nozzles for use in the catalyst regenerator of a catalytic cracking unit.

Still a further object of this invention to provide a method for introducing combustion-supporting air into a bed of cracking catalyst particles to prevent or reduce nozzle failures between unit turnarounds.

Further objects, embodiments, advantages, features and details of this invention will become apparent to those skilled in the art from the following drawing description, detailed description of the invention and appended claims.

SUMMARY OF THE INVENTION

A catalytic cracking unit comprises a cracking reactor (i.e. "cracker"), a cracking catalyst and a catalyst regenerator (i.e. "regenerator"). In one embodiment of the invention, there is provided an improved regenerator for a catalytic cracking unit. The outside of the regenerator is defined by a regeneration vessel. The regenerator is provided with a means for the introduction of coked cracking catalyst. The coke on the cracking catalyst is deposited thereon during its residence in the cracker. The regenerator is further provided with a means for withdrawing regenerated cracking catalyst from the regeneration vessel.

At least one oxidant gas distribution means is positioned in the regeneration vessel. The oxidant gas distribution means is formed from at least one generally horizontally positioned pipe. A plurality of nozzles open through the sidewall of the horizontally positioned pipe for the introduction of oxidant gas into the regeneration vessel.

In accordance with another embodiment, this invention provides improved nozzles for distributing oxidant gas into the regeneration vessel. One such improved nozzle is provided with at least one baffle plate tangently attached to the longitudinal exterior surface of a cylindrically shaped pipe and extends at least along that portion of the cylindrically-shaped pipe which extends beyond the external wall of the oxidant gas distribution means. Another such improved nozzle is one having a substantially polyhedrenally-shaped external configuration. Examples of such polyhedrenally-shaped nozzles include, but are not limited to, hexagonal nozzles and square nozzles.

In accordance with yet a further embodiment of the present invention, there is provided an improved process for regenerating coked cracking catalyst. Generally, an oxygen-containing gas is introduced into a fluidized bed of coked cracking catalyst particles through improved nozzles arranged on the under side of a generally horizontally positioned pipes which supply the oxygen-containing gas. Certain aspects of this embodiment can be practiced by introducing at least a portion of the oxygen-containing gas into the fluidized bed through such improved nozzles which have at least one baffle plate tangently attached to the longitudinal exterior surface of a cylindrically-shaped pipe. Further aspects of this embodiment can be practiced by introducing at least a portion of the oxygen-containing gas into the fluidized bed through polyhedrenally-shaped nozzles.

These and other embodiments of the invention are more thoroughly described in the following detailed description, with reference to the attached drawings, and the appended claims.

DETAILED DESCRIPTION OF THE INVENTION

Figure 1:
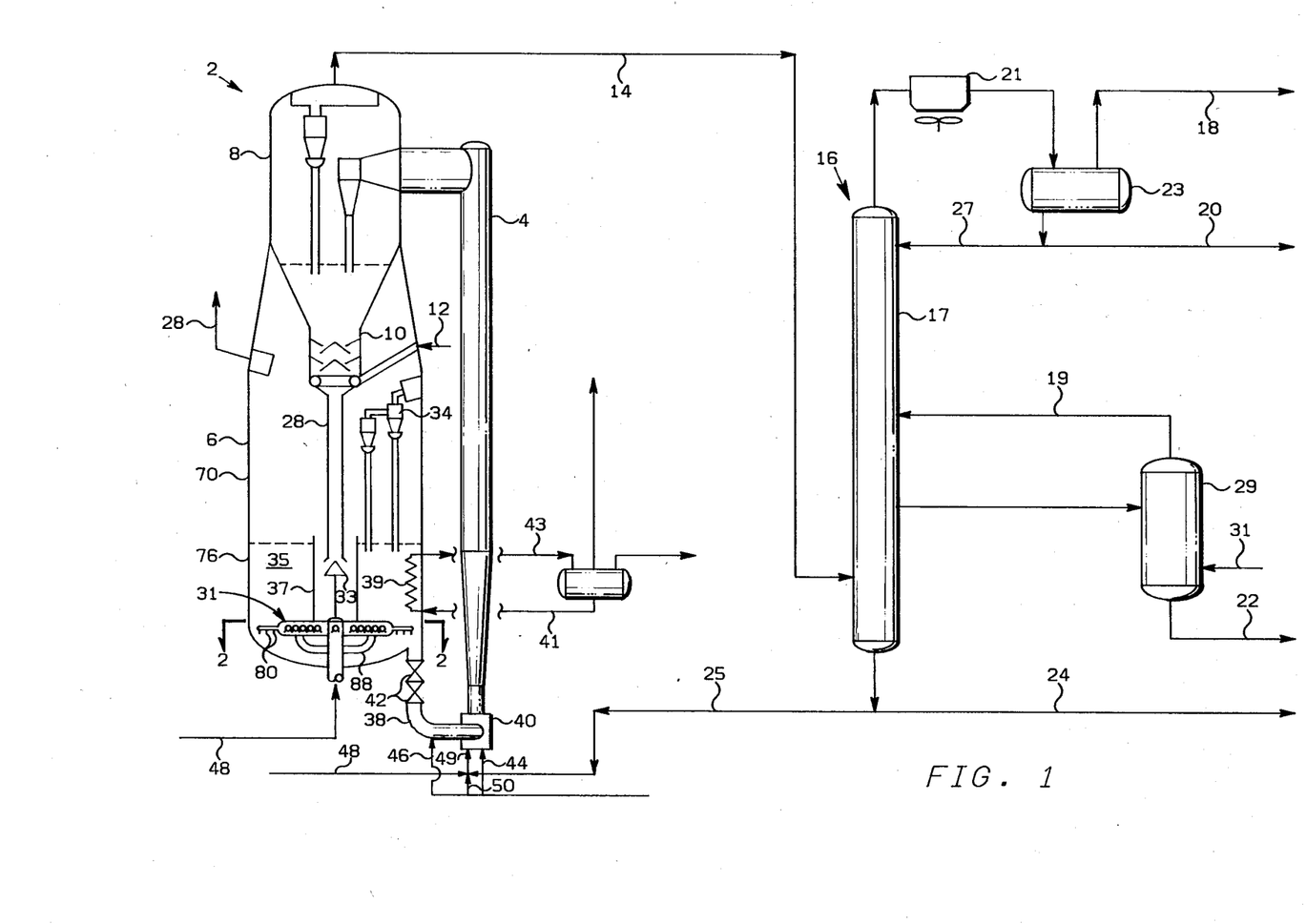
FIG. 1 schematically illustrates certain features of one type of catalytic cracking unit which can embody certain features of the present invention.

With reference to FIG. 1, one type of fluid catalytic cracking unit (FCCU) 2 comprises a riser-reactor 4, a regenerator 6, a catalyst/product separation zone or disengager 8, which usually contains several cyclone separators, and a stripping section or zone 10 in which gas, usually steam such as introduced from line 12, strips entrained hydrocarbon from the coked catalyst. Overhead product from the separation zone 8 is conveyed via line 14 to a separation zone 16 including a main fractionator 17. The product can be separated, for example, as follows. Light hydrocarbons in condenser 21 can be withdrawn from the zone 16 by line 18. Gasoline range liquids accumulated in accumulator 23 can be withdrawn by line 20 or refluxed via line 27. Distillates, such as light cycle oils, can be withdrawn by line 22 from stripper 29 after being stripped with steam introduced via line 31. The overhead of light hydrocarbons 19 from stripper 29 can be recycled to column 17. Bottoms from column 17 can be withdrawn by line 24 or recycled to the riser 4 by line 25, as desired.

After being stripped in zone 10, the cracking catalyst is conveyed from zone 10 to the regenerator 6 by line or standpipe 28 for the purpose of coke burnoff. Flow of catalyst into regenerator 6 can be controlled by a plug valve 33 positioned under the outlet of the standpipe 28. The catalyst can be distributed from standpipe 28 into a dense phase fluidized bed 35 by flowing over a weir 37 positioned in regenerator 6. In regenerator 6, molecular oxygen-containing gas, usually air or an air/steam mixture, is introduced by line 30 and distributed by one or more distributors 31. Coke deposits are burned from the catalyst in regenerator 6 forming an effluent gas which is separated from the catalyst through a plurality of cyclone separators 34. These flue gases are withdrawn from regenerator 6 by line 36. Coil 39 in regenerator 6 is used to convert boiler feed water, introduced via line 41, into high pressure steam which is withdrawn via line 43.

Hot regenerated catalyst passes from regenerator 6 to a lift pot 40 at lower end of the riser-reactor 4 by conduit 38, which provides a source of hot, low carbon-containing cracking catalyst particles for riser-reactor 4. The flow rate of regenerated catalyst is controlled by valves 42 which are positioned in conduit 38, preferably in a vertical portion thereof. In lift pot 40, regenerated catalyst from conduit 38 is fluidized with a fluidizing gas, usually steam, which is introduced into lift zone 40 by either lines 44 or 46 connected to steam source 45. The oil feedstock is introduced into lift pot 40 via a nozzle assembly 49 which is connected to a source of oil feedstock, such as a gas oil feed line 48, and the recycle line 25. Atomizing gas such as steam can be added to nozzle assembly 49 by line 50, for example, which connects nozzle assembly 49 to steam source 45.

The operating conditions for riser-reactor 4 and regenerator 6 can be conventional. Usually, the temperature in riser-reactor 4 will be in the range of from about 850° F. to about 1050° F. preferably in the range from about of 925° F. to about 1025° F. for heavy oils. The oil is usually admixed with steam at a weight ratio of oil to steam in the range from about 6:1 to about 25:1. A catalyst:oil weight ratio employed in riser-reactor 4 is generally in the range from about 2:1 to about 20:1, usually between about 2:1 and about 15:1, preferably between about 3:1 to about 10:1. Pressure in riser-reactor 4 is usually in the range from about 15 psia to about 60 psia (pounds per square inch absolute), preferably the pressure is less than about 25 psia for heavy oils. The cracking catalyst particles generally have a size in the range from about 20 microns to about 200 microns, usually from about 40 microns to about 80 microns, preferably about 60 microns. Flow velocity upward in the vertical section of riser-reactor 4 is generally in the range from about 10 feet per second to about 30 feet per second in the lower portion of riser-reactor 4 up to about 40 feet per second to about 120 feet per second in the upper portion of riser-reactor 4. The contact time between the catalyst and oil in riser-reactor 4 is generally in the range from about 0.25 second to about 4 seconds, usually from about 1 second to about 3 seconds when the oil is injected into the bottom of the riser. Preferably, contact times for heavy oils are less than about 2.5 seconds. The regenerator is generally operated at a temperature in the range from about 1100° F. to about 1500° F., usually from about 1150° F. to about 1450° F., and is ordinarily provided with sufficient oxygen-containing gas to reduce the coke on the catalyst to a level of about 0.5 weight percent or less, preferably less than 0.1 weight percent.

Any suitable catalyst may be used for practicing this invention. Examples of such catalysts suitable for catalytic cracking include, but are not limited to, silica-alumina or silica-magnesia synthetic microspheres or ground gels and various natural clay-type or synthetic gel-type catalysts. Most preferably, fluidizable zeolite-containing cracking catalysts are employed. Preferred catalysts can have a surface area in the range from about 50 m²/g to about 500 m²/g and a particle size in the range from about 40 microns to about 80 microns.

Figure 2:
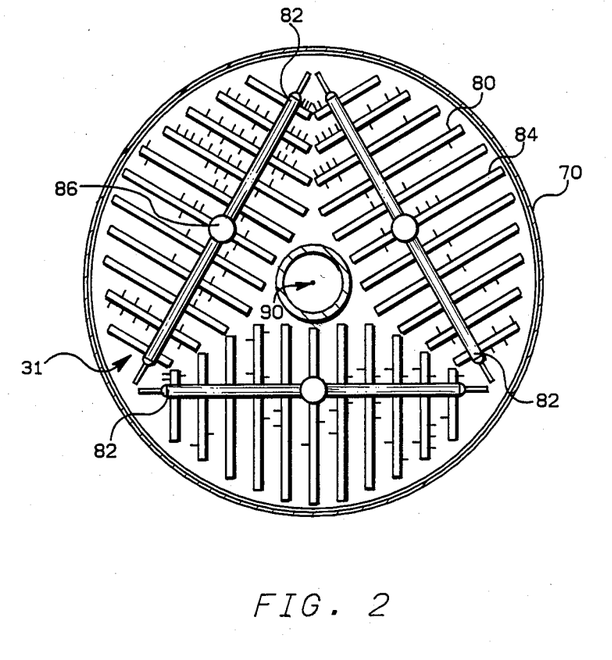
FIG. 2 illustrates a cross section of a portion of the unit in FIG. 1 when viewed along lines 2—2.

The present invention is applicable to any suitable catalyst regenerator for a catalytic cracking unit. Generally speaking, such suitable regenerators will comprise a regeneration vessel 70. The regeneration vessel 70 will be provided with a means 72 for the introduction of coked cracking catalyst therein. The standpipe 28 can serve as the means 72, for example. The regeneration vessel 70 is further provided with a means 74 for withdrawing regenerated cracking catalysts therefrom. The conduit 38 can serve as the means 74, for example. The at least one oxidant gas distributor 31 is positioned in a lower portion 76 of regeneration vessel 70. The oxidant gas distributors 31 may be in any suitable configuration. Examples of such suitable configuration, include, but are not limited to, cocentric circles and substantially straight pipe sections. Preferably the oxidant gas distributors 31 comprise substantially straight pipe sections as illustrated in FIG. 2. Preferably, the oxidant gas distributor 31 is formed from at least one generally horizontally positioned pipe comprising lateral air conduits 84 (ie. "laterals") with a plurality of nozzles 80 opening through the sidewall of the generally horizontally positioned pipe for the emission of oxidant gas from the inside of the generally horizontally positioned laterals 84 to the inside of regeneration vessel 70.

In FIG. 1, only one oxidant gas distributor is illustrated for purposes of clarity. As mentioned earlier, FIG. 2 illustrates a preferred embodiment of the invention wherein a plurality of oxidant gas distributors 31 are positioned in the lower portion 76 regeneration vessel 70. In this embodiment, each of the oxidant gas distributors 31 comprises a generally horizontally positioned main air header 82 attached to a oxidant gas supply source 86 and a plurality of generally horizontally positioned laterals 84 connected to each of the main air headers 82. The main air header 82 and laterals 84 are preferably formed from generally straight pipe sections and at least most of the nozzles 80 open into regeneration vessel 70 through the sidewalls of laterals 84. Preferably, reaction vessel 70 contains three of the oxidant gas distributors 31, because three have been used in such a unit to provide good distribution of the oxidant gas.

In a preferred embodiment, each of the three oxidant gas distributors 31 illustrated in FIG. 2 comprises a generally vertically positioned supply pipe 86 extending into the lower portion 76 of reaction vessel 70. The supply pipe 86 is connected to about the midpoint of each of the main air headers 82. Secondary pipe arms 88 preferably extend between the generally vertical supply pipe 86 and the generally horizontally positioned main air header 82 connecting to positions on each which are spaced apart from the midpoint of the main air header. By supporting the air distributors in this manner, temperature induced stresses can be maintained at low values. By spacing the generally vertically positioned supply pipes 86 generally equidistantly from each other and generally equidistantly from a longitudinal axis 90 of regeneration vessel 70, each of the air distributors 31 can be sufficiently structurally similar to facilitate fabrication. The laterals 84 are preferably connected generally normally to each of the main air headers 82 and define a generally horizontally positioned pipe grid or system with nozzle opening through the sidewall of the pipe. The laterals 84 preferably vary in length with laterals near the ends of the main air headers 82 generally being shorter than the laterals near the midpoints of the main air headers to provide for an oxidant gas supply grid which provides air with good uniformity across the regeneration vessel in a plane which is generally normal to the longitudinal axis 90 of the regeneration vessel 70.

The nozzles 80 in FIG. 2 illustrate only a small number of the nozzles which would be placed in a commercial unit. The illustrated nozzles 80 in FIG. 2 are patterned to represent eroded nozzles which were observed after a shutdown of a commercial catalyst regeneration unit. Severe erosion was discovered on the bottom side of the air nozzles 80. In some of the nozzles, holes were found worn completely through the 1¼ inch Schedule 160, 304 stainless steel walls. These holes were generally located on the bottom side of the nozzles and where the nozzles were attached to the lateral. Most of the erosion appeared to be external on the underside tips of those nozzles pointing outward toward the regenerator walls. Primary areas where erosion was most prevalent were the nozzles on those laterals at the tailend of the main air headers and at the first nozzle on each lateral along the main air headers. A concentration of eroded nozzles was observed on the shorter laterals near the ends of the main air headers.

Figure 3:
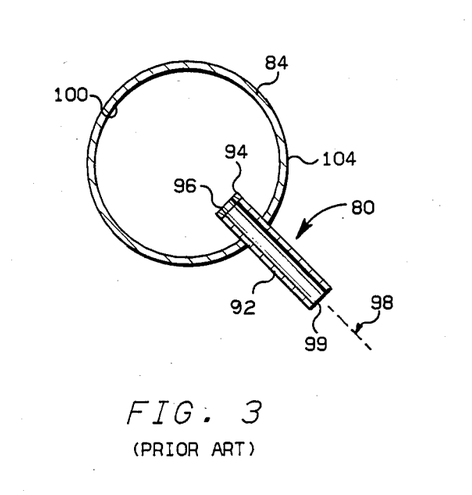
FIG. 3 is a cross-sectional view of a portion of a "prior art" apparatus shown in FIG. 2 when viewed radially outwardly.

The design of the eroded nozzles is illustrated in FIG. 3. These nozzles 80 are formed from a generally straight cylindrically-shaped pipe section 92 extending downwardly through the sidewall of lateral 84 generally normally to lateral 84 and preferably at an angle of 45° from the vertical. It is believed that the nozzles could be turned from the vertical in this type of distribution system at an angle in the range of from about 20° to about 70° without a substantial difference in results. The inlet end portion 94 of nozzle 80 can be defined by a generally annular flange 96 extending generally radially inwardly from the straight cylindrically-shaped pipe section 92 toward the longitudinal axis 98 of nozzle 80. The inlet end portion 94 is spaced apart from the inside wall 100 of lateral 84 by approximately one inch, although the positioning of the inlet end portion 94 of nozzle 80 could be varied from about 0.5 inches to about 2 inches from the inside wall 100 of lateral 84 without a substantial difference in results where lateral 84 has an inside diameter of between 5 inches to about 10 inches. The hole defined by the generally annular flange 96 can be drilled after flange 96 is attached to the cylindrically-shaped pipe section 92 and has an inside diameter of about 15/16 inches. The cylindrically-shaped pipe section 92 can be formed from 1¼ inch Schedule 160 stainless steel pipe. The discharge end portion 99 of nozzle 80 can be spaced apart by approximately 3.4 inches to about 6 inches from the outside wall 104 of lateral 84.

The present invention differs substantially from the nozzle 80 illustrated in FIG. 3 in a number of ways. One major distinguishing factor is that the improved nozzles of the present invention contain at least one planar exterior surface extending substantially along that length of the nozzles exposed to the erosive flow of hot catalyst. This planar exterior surface, when positioned within a regenerator perpendicular to an erosive flow of hot catalyst, will cause the catalyst currents to flow at right angles along the planar surface of the inventive nozzles. By causing such an abrupt diretional change of flowing catalyst, the erosive effect of the catalyst, generally parallel to the planar surface of the inventive nozzles, also provides a buffering effect shielding these nozzles from other erosive currents of hot catalyst.

With reference to one embodiment of the present invention, an improved nozzle is provided whereby at least one flat baffle plate is tangentally attached to the longitudinal exterior surface of a generally cylindrical pipe section. The baffle plate or plates may be tangentally attached to any point along the circumference of the generally cylindrical pipe section and should extend along, at least, that portion of the nozzle extending beyond the external wall of the oxidant gas distribution means (i.e., lateral 84).

Figure 4:
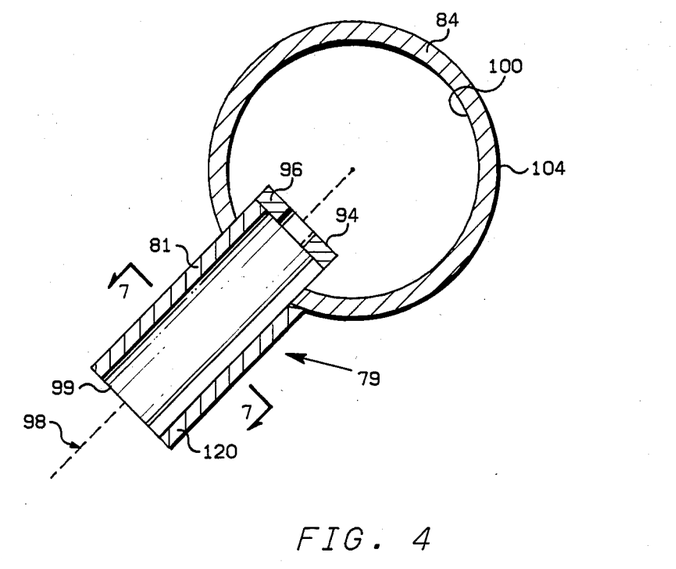
FIG. 4 is a cross-sectional view, from the same perspective as in FIG. 3, illustrating certain features of one embodiment of the present invention.

With reference to FIG. 4, and in accordance with one preferred embodiment of the present invention, at least one improved nozzle 79 is provided in the catalyst regenerator through the side wall of lateral 84. Such improved nozzle comprises a baffle plate 120 and a substantially straight cylindrical pipe section 81. Baffle plate 120 is tangently attached, by any suitable means, to the lower end portion of the external longitudinal surface of generally cylindrical pipe section 81.

Figure 5:
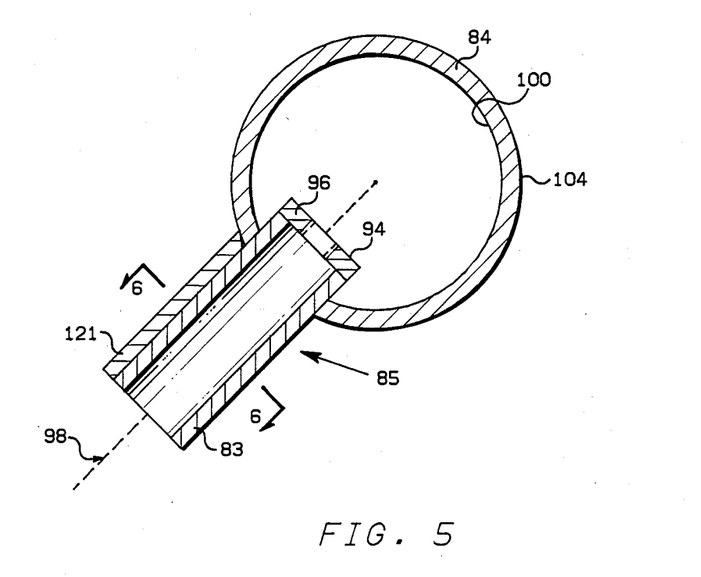
FIG. 5 is a cross-sectional view, from the same perspective as in FIG. 3, illustrating certain features of another embodiment of the present invention.

With reference to FIG. 5, and in accordance with another preferred embodiment of the present invention, at least one improved nozzle 85 is provided in the regenerator through the side wall of lateral 84. This particular nozzle comprises a baffle plate 121 which is tangentally attached to the upper end portion of the external longitudinal surface of generally cylindrical pipe section 83.

Figure 6:
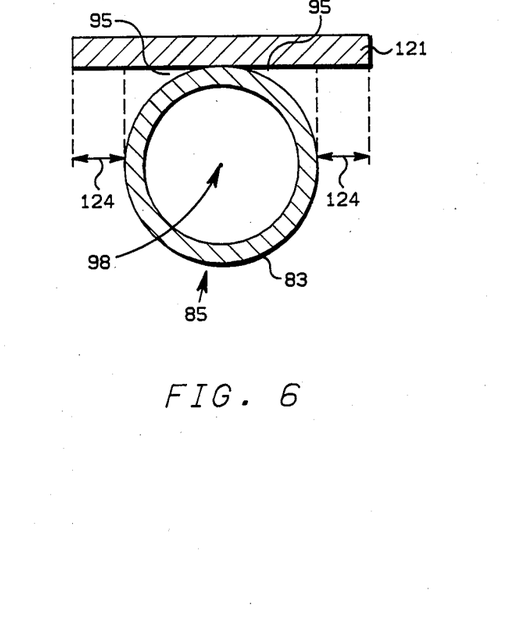
FIG. 6 is a view along line 6—6 of FIG. 5.
Figure 7:
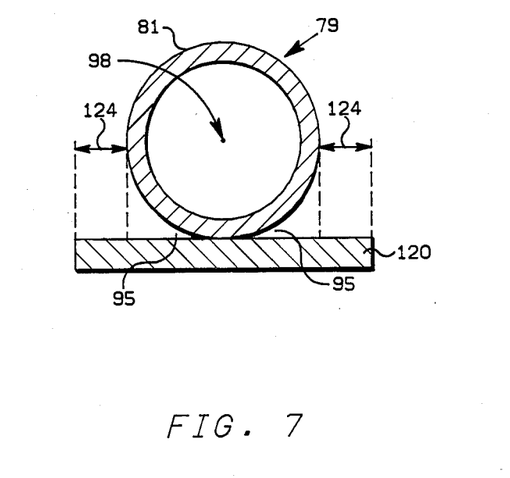
FIG. 7 is a view along line 7—7 of FIG. 4.

With reference to FIGS. 6 and 7, these are cross sectional views of the improved nozzles 85 and 79 illustrated in FIGS. 5 and 4 respectively. Baffle plates 120 and 121 may be affixed to generally cylindrical pipe sections 81 and 83 by any suitable means. One such suitable means is by welding at the points designated by item 95. In both FIGS. 6 and 7, the baffle plates 121 and 120 are extended beyond the external diameter of generally cylindrical pipe sections 81 and 83 by a distance represented as item 124. This distance can vary with the circumference of the pipe section used. Generally, this distance will range from about zero to about 400 percent of the external diameter of the pipe sections. Pipe sections 81 and 83 may have any suitable diameter.

Generally, the diameter of these pipe sections is in the range from about ½ inch to about 3 inches. Preferably, the diameter of pipe sections is in the range from about 1 inch to about 2 inches. Baffle plates 120 and 121 may have any suitable width. Generally, the width of the baffle plates is in the range from about ½ inch to about 10 inches. Preferably, the width of the baffle plates is in the range from about 1 inch to about 5 inches. In a most preferred configuration, the pipe sections have an external diameter of 1¼ inches, the baffle plates have a width of 2¾ inches and the baffle plates extend beyond each side of pipe sections by approximately ¾ inch.

Figure 8:
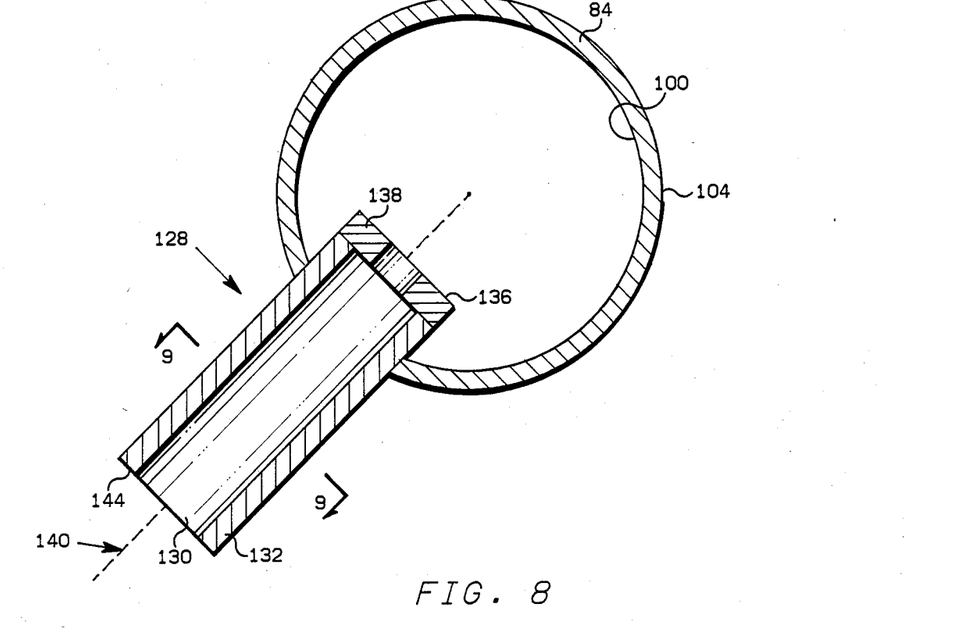
FIG. 8 is a cross-sectional view, from the same perspective as in FIG. 3, illustrating certain features of yet another embodiment of the present invention.

With reference to FIG. 8, and in accordance with yet another embodiment of this invention, a polyhedrenally-shaped nozzle 128 is formed from a generally straight bar stock section 132 cut to a predetermined length and having a suitable bore 130 drilled through its center along its longitudinal axis 140. In practicing this embodiment of the invention, at least one polyhedrenally shaped nozzle 128 extends downwardly through the side wall of lateral 84 generally normal to the lateral and preferably at an angle of 45° from the vertical. It is believed that nozzle 128 could be turned from the vertical in this type of distribution system at an angle in the range from about 20° to about 70° without a substantial difference in results. The inlet end portion 136 of the polyhedrenally-shaped nozzle 128 can be defined by a flange 138 extending generally inwardly from the straight bar stock section 132 toward the longitudinal axis 140 of the polyhedrenally-shaped nozzle 128. The inlet end portion 136 is preferably spaced apart from the inside wall 100 of lateral 84 by approximately 1 inch, although it is believed that the positioning of the inlet end portion 136 of nozzle 128 could be varied from about 0.5 inch to about 2 inches from the inside wall 100 of lateral 84 without a substantial difference in results wherein lateral 84 has an inside diameter from about 5 inches to about 10 inches. The discharge end portion 144 of nozzle 128 can be spaced apart from about 3 inches to about 6 inches from the outside wall 10 of lateral 84.

Figure 9:
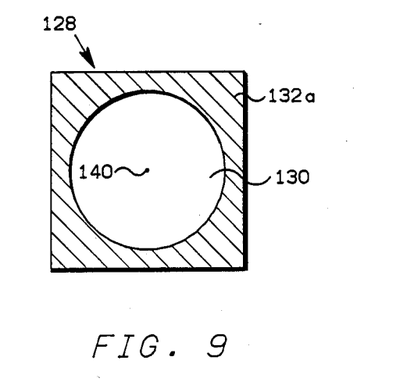
FIG. 9 is a view along line 9—9 of FIG. 8.
Figure 10:
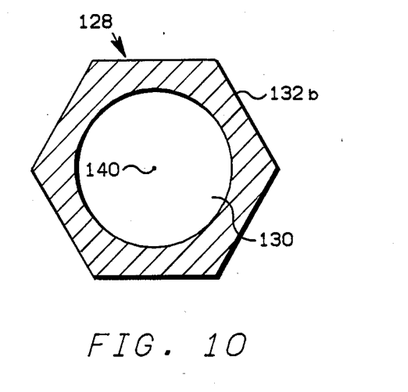
FIG. 10 is a view along a line similar to that of 9—9 of FIG. 8.

With reference to FIGS. 9 and 10, these are embodiments illustrating preferred polyhedronally shaped nozzles 128 as viewed through line 9—9 of FIG. 8. Specifically, the bar stock section 132a comprising nozzle 128 of FIG. 9 is substantially square. On the other hand, the bar stock section 132b comprising nozzle 128 of FIG. 10 is substantially hexagonal. These two improved nozzle designs may be made by any suitable means. One such suitable means is by drilling an appropriately sized bore 130 along the center longitudinal axis 140 of a stainless steel bar stock section having the desired shape.

In accordance with yet another embodiment, this invention provides a multi-shaped nozzle for distributing gas into a catalyst regenerator. The discharge end portion of the multi-shaped nozzle has a polyhedronally-shaped external configuration while the inlet end portion of the same nozzle has a cylindrically-shaped external configuration. This multi-shaped nozzle can be made by any suitable means. One such suitable means is by machining the nozzle from one piece of bar stock. Another such suitable means is illustrated by FIG. 11.

Figure 11:
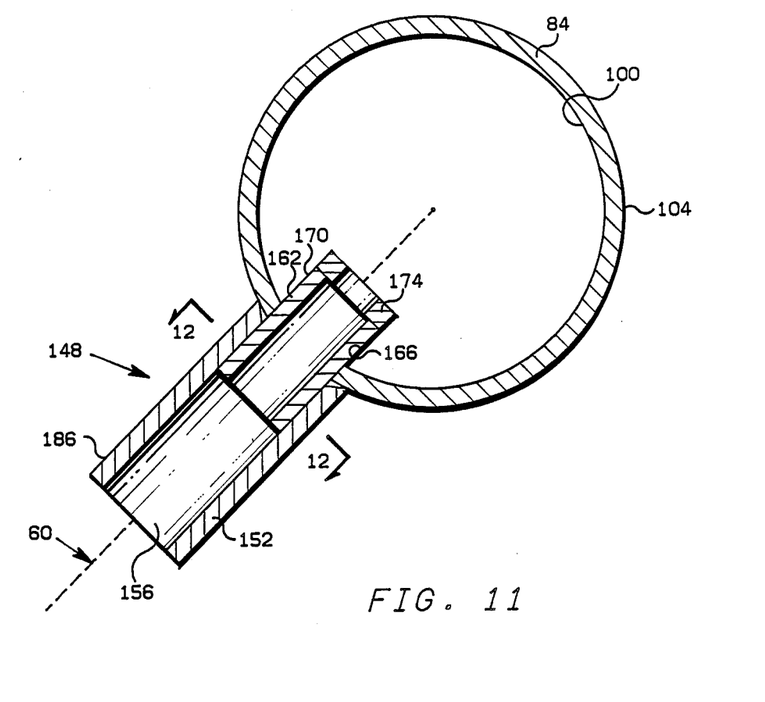
FIG. 11 is a cross-sectional view, from the same perspective as in FIG. 3, illustrating certain features of still a further embodiment of the present invention.

In FIG. 11, nozzle 148 is formed from a generally straight bar stock section 152 cut to a predetermined length and having a suitable bore 156 drilled through its center along its longitudinal axis 160. A cylindrically-shaped pipe section 162, whose outer wall 166 has a diameter substantially equal to the inside diameter of bore 156 is partially inserted into the polyhedrenally-shaped bar stock section 152. The portion of the cylindrically-shaped pipe section 162 extending from bar stock 152 is inserted through the side wall of lateral 84. The angle at which multi-shaped nozzle 148 extends downwardly through the sidewall of lateral 84 has the same limitations as set forth in the description of FIGS. 4, 5 and 8. Moreover, the inlet end portion 170 of multi-shaped nozzle 148 can be defined by a generally anular flange 174. The inlet end portion 170 of the cylindrically-shaped pipe section 162 is preferably spaced apart from the inside wall 100 of lateral 84 by approximately 1 inch, although the positioning of the inlet end portion 170 could probably be varied from about 0.5 inch to about 2 inches from the inside wall 100 of lateral 84 without a substantial difference in results wherein the lateral 84 has an inside diameter from about 5 inches to about 10 inches. The discharge end portion 178 of the cylindrically-shaped pipe section 162 preferably extends into the inlet end portion 182 of straight bar stock section 152 approximately 1 inch, although the positioning of the discharge end portion 178 of cylindrical pipe section 162 into bore 156 could be varied from about zero inches to about the length of straight bar stock section 152. The discharge end portion 186 of straight bar stock section 152 can be spaced apart from the outside wall 104 of lateral 84 from about 3 to about 6 inches.

Figure 12:
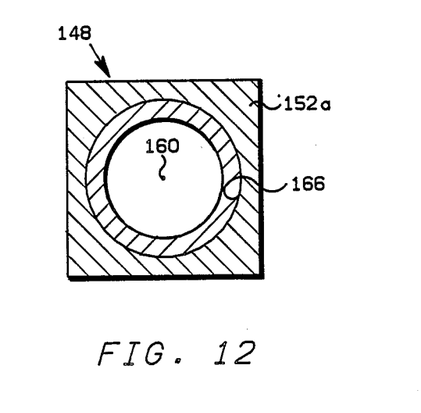
FIG. 12 is a view along line 12—12 of FIG. 11.
Figure 13:
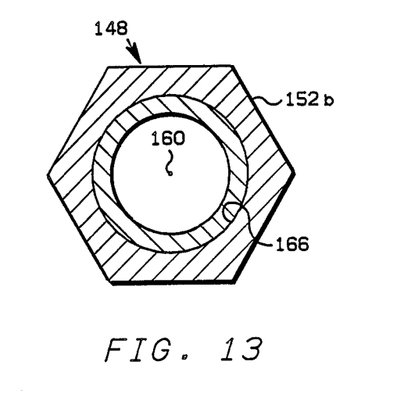
FIG. 13 is a view along a line similar to that of 12—12 of FIG. 11.

With reference to FIGS. 12 and 13, these are embodiments illustrating preferred multi-shaped nozzles 148 as viewed through line 12—12 of FIG. 11. Specifically, the bar stock section 152a comprising the discharge end portion 186 of multi-shaped nozzle 148 of FIG. 12 is substantially square. While, on the other hand, the bar stock section 152b comprising the discharge end portion 186 of multi-shaped nozzle 148 of FIG. 13 is substantially hexagonal.

The invention can be practiced if desired by introducing an oxygen-containing gas into a fluidized bed of cracking catalyst particles. Where the oxygen-containing gas is introduced through nozzles, the invention can be practiced by introducing at least a portion of the oxygen-containing gas through the improved nozzles provided by one or more embodiments of this invention. In one embodiment, the oxygen-containing gas can be introduced through nozzles having at least one baffle plate extending substantially along that length of the nozzles exposed to the erosive flow of hot catalyst. The baffle plate or plates can be tangentally attached by any suitable means to the longitudinal external wall of cylindrically-shaped pipe sections. The baffle plate or plates cause eddie currents of erosive catalyst to migrate around the side walls of the cylindrically-shaped pipe sections. Furthermore, it should be noted that the baffle plate or plates show an insignificant amount of erosion since the eddie current of catalyst provide a buffering effect shielding the baffle plate or plates. Therefore, depending on where erosion most often occurs for a particular nozzle within a particular regenerator, the orientation, number and width of the baffle plate or plates can vary. Generally, the baffle plate will be substantially horizontal as illustrated in FIGS. 6 and 7. Preferably, when the cylindrically-shaped pipe section has an outside diameter of about 1 inch to about 2 inches, the baffle plate ends, represented by item 124 in FIGS. 4 and 5, will extend beyond the outside diameter of the cylindrically-shaped pipe section by about zero inches to about 1¼ inches.

In another embodiment, the oxygen-containing gas can be introduced into the fluidized bed through polyhedrenally-shaped nozzles. In this embodiment, it is the actual shape of the nozzle, as opposed to the addition of a baffle plate, which greatly decreases the erosive effects of the hot catalyst within the regenerator. Depending, again, on the location where erosion most often occurs for a particular nozzle in a particular regenerator, the actual shape and orientation of these novel polyhedrenally-shaped nozzles can vary. Generally, the nozzles should be oriented so that a erosive flow of catalyst is substantially perpendicular to one of the nozzles flat planes.

Preferably, the oxygen-containing gas is circulated through a generally vertically positioned pipe and into a generally horizontally positioned main air header enroute to the nozzles. A plurality of generally horizontally positioned laterals are connected to the main air headers and the nozzles are attached to the laterals. The laterals form at least a portion of the generally horizontally positioned grid of supply lines and are preferably generally connected normally to the main air headers. The laterals are usually various lengths with the laterals near the ends of the main air headers generally being shorter than the laterals near the midpoints of the main air headers. Preferably, the laterals near the midpoints of the main air headers have a slightly larger diameter than the laterals near the ends of the main air headers to equalize the pressure drop between the main air header and the ends of the laterals. The laterals are usually closed off at their ends. Usually, the nozzles are arranged on the undersides of the laterals and at least a major portion of the inventive nozzles are concentrated on the underside of at least one of the shorter laterals near the ends of the main air header.

Reasonable variation and modification which will be apparent to those skilled in the art can be made in this invention without departing from the spirit and scope thereof.

What is claimed is:

1. In a regenerator for a catalytic cracking unit, said regenerator comprising
   (a) a regeneration vessel;
   (b) a means for introducing coked cracking catalyst into said regeneration vessel;
   (c) a means for withdrawing regenerated cracking catalyst from said regeneration vessel; and
   (d) at least one oxidant gas distributor having an internal wall and an external wall positioned in said regeneration vessel,
   the improvement comprising at least one elongated nozzle, having an inlet end portion, an outlet end portion and at least one planar external surface generally parallel to said nozzle's longitudinal axis, the inlet end portion of said nozzle opening into said distributor and said at least one planar surface extending at least along the portion of said nozzle extending beyond said external wall of said distributor into said regeneration vessel for the introduction of oxidant gas into said regeneration vessel.

2. In a regenerator as in claim 1 wherein said at least one elongated nozzle is formed from a generally straight cylindrically-shaped pipe section and wherein said at least one planar surface comprises at least one flat baffle plate attached tangentially to said cylindrically-shaped pipe section, generally parallel to said cylindrically-shaped pipe section's longitudinal axis.

3. In a regenerator as in claim 1 wherein a plurality of oxidant gas distributors are positioned in said regeneration vessel and each of said oxidant gas distributors comprises a generally horizontally positioned main air header and a plurality of generally horizontally positioned lateral air conduits connected to said main air header, said main air header and said lateral air conduits being formed from generally straight pipe sections; said nozzle extending into said regeneration vessel through the sidewalls of said lateral air conduits.

4. In a regenerator as in claim 3 wherein three said oxidant gas distributors are positioned in said regeneration vessel and each of said oxidant gas distributors further comprises a generally vertically positioned supply pipe leading into said regeneration vessel and connected to about the midpoint of said main air headers, said vertically positioned supply pipes being generally equidistantly spaced from each other and generally equidistantly spaced from a longitudinal axis of said regeneration vessel; said lateral air conduits being connected generally normally to said main air headers and being of various lengths with the said lateral air conduits near the ends of said main air headers generally being shorter than the said lateral air conduits near the midpoints of said main air headers.

the improvement comprising a plurality of elongated nozzles wherein each of said elongated nozzles have at least one planar surface and are positioned on at least one of said shorter lateral air conduits near the ends of at least one of said main air headers.

5. In a regenerator as in claim 1 wherein said at least one elongated nozzle has a plurality of exterior planar surfaces generally parallel to said elongated nozzle's longitudinal axis.

6. In a regenerator as in claim 5 wherein said at least one elongated nozzle has four planar exterior surfaces generally parallel to said elongated nozzle's longitudinal axis.

7. In a regenerator as in claim 6 wherein the inlet end portion of said at least one elongated nozzle has a generally cylindrically-shaped exterior surface extending through the sidewall of said distributor while the discharge end portion of said at least one elongated nozzle has four planar exterior surfaces.

8. In a regenerator as in claim 5 wherein said at least one elongated nozzle has six planar exterior surfaces generally parallel to said elongated nozzle's longitudinal axis.

9. In a regenerator as in claim 8 wherein the inlet end portion of said at least one elongated nozzle has a generally cylindrically-shaped exterior surface extending through the sidewall of said distributor while the discharge end portion of said at least one elongated nozzle has six planar exterior surfaces.

* * * * *